(12) United States Patent
Stern

(10) Patent No.: US 10,536,552 B2
(45) Date of Patent: Jan. 14, 2020

(54) SYSTEMS AND METHODS TO RELOCATE LIVE COMPUTE ASSETS

(71) Applicant: Defense Information Systems Agency, Arlington, VA (US)

(72) Inventor: David J. Stern, Fort Meade, MD (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 56 days.

(21) Appl. No.: 15/583,720

(22) Filed: May 1, 2017

(65) Prior Publication Data

US 2017/0318116 A1 Nov. 2, 2017

Related U.S. Application Data

(60) Provisional application No. 62/330,434, filed on May 2, 2016.

(51) Int. Cl.
*H04L 29/08* (2006.01)

(52) U.S. Cl.
CPC ................. *H04L 67/2842* (2013.01)

(58) Field of Classification Search
CPC .............. H04L 41/0836; H04L 67/2842
USPC ........................................................ 709/214
See application file for complete search history.

(56) References Cited

U.S. PATENT DOCUMENTS

| 8,495,629 | B2* | 7/2013 | Celeskey | G06F 11/328 718/1 |
|---|---|---|---|---|
| 2005/0044114 | A1* | 2/2005 | Kottomtharayil | G06F 3/0617 |
| 2011/0131568 | A1* | 6/2011 | Heim | G06F 9/4856 718/1 |
| 2011/0268113 | A1* | 11/2011 | Suzuki | G06F 9/4856 370/389 |
| 2012/0096459 | A1* | 4/2012 | Miyazaki | G06F 9/45558 718/1 |
| 2012/0192182 | A1* | 7/2012 | Hayward | G06F 9/455 718/1 |
| 2012/0311568 | A1* | 12/2012 | Jansen | G06F 9/45558 718/1 |

(Continued)

*Primary Examiner* — June Y Sison
*Assistant Examiner* — Adam A Cooney
(74) *Attorney, Agent, or Firm* — US Naval Research Laboratory; William P. Ladd

(57) ABSTRACT

Systems and methods are provided to ensure lossless and ordered traversal of digital information destined for and generated from a plurality of live compute assets during the relocation of a plurality of live compute assets from one network enabled computer to a plurality of network enabled computers. After the storage of digital information is initiated through the controlled devices, the live compute assets are relocated to the new computer(s). Simultaneously, or following the relocation of the computer assets, the digital information temporarily stored within the network may be moved and stored subsequently within the network to optimize the reliable delivery through software control of the physical and virtual network/network enabled devices. Upon completion of the relocation of the live compute assets, software is utilized to complete network traversal of new and temporarily stored digital information through the network to/from the relocated compute assets in an ordered, lossless, and reliable manner.

20 Claims, 4 Drawing Sheets

(56) References Cited

U.S. PATENT DOCUMENTS

2015/0365436 A1* 12/2015 Shenefiel ............... H04L 63/20
726/1

* cited by examiner

SYSTEMS AND METHODS TO RELOCATE LIVE COMPUTE ASSETS

CROSS REFERENCE TO RELATED APPLICATIONS

This application claims the benefit of U.S. Provisional Patent Application No. 62/330,434, filed on May 2, 2016, which is incorporated by reference herein in its entirety.

FIELD OF THE DISCLOSURE

This disclosure relates to computer networks, including distributed temporary storage of data in a network.

BACKGROUND

Compute assets are computer network architectures or emulations that can be used to store information on a computer network. For example, compute assets can include virtual machines or containers. Currently, when a plurality of live compute assets (e.g., virtual machines, containers, etc.) are relocated within a network, transmitted digital information to and from a live compute asset fails to reach the intended destination as a result of the relocation process. For example, when a compute asset is relocated, packets may still be transmitted to the previous location while the compute asset is being moved. As a result, some packets can be dropped, and information can be lost. No current solutions control the temporary storage capabilities of a plurality of network/network enabled devices to store traffic during a relocation process that ensure the digital information arrives reliably when the relocation process concludes.

Referring now to FIG. 1 to explain the subject matter more clearly, illustrated is a Computer 10 with a live compute asset (e.g., virtual machine, container, etc.) 12 and a plurality of additional compute assets 13. The live compute asset 12 is shown to be relocating to a computer 18 through a plurality of physical and virtual network/network enabled devices 17. The compute assets 12, 13 can require software such as, but not limited to, a hypervisor or host operating system/container engine 14 to operate. Both the live compute asset 12 and the hypervisor or host operating system/container engine 14 require the underlying computer physical hardware 15 to function. To connect the computers 10, 18 to a digital information network, a virtual or physical connection (PHY)/network interface 16 can be required.

Referring now to FIG. 2, additional detail for one of a plurality of network/network enabled devices 17 is shown. The network/network enabled device 17 receives and transmits digital information 19 through a plurality of virtual and physical connections (PHY)/network interfaces 16 to a plurality of network/network enabled devices 17 and a plurality of computers 10, 18. The network/network enabled device operating system and network/network enabled device hardware 21 processes the digital information 19 arriving at the network/network enabled device 17 through the virtual and physical connections (PHY)/network interfaces 16. The network/network enabled device operating system and physical or virtual network/network enabled device hardware 21 utilizes a match/action mechanism 20 to connect the digital information 19 between various devices. The OpenFlow® protocol from the Open Networking Foundation is an example of software control of a network/network enabled device through a network/network enabled device operating system and software programming of a plurality of match/actions to connect computers through a network.

In normal operation and still referring to FIG. 2, the match/action mechanism 20 instructs the departure of digital information 19 to a plurality of programmed virtual or physical connection (PHY)/network interfaces 16 that connect to a destination computer. During a relocation operation of a compute asset 12 between computers 10, 18, the digital information 19 becomes undeliverable and is discarded/lost during the transition of the compute asset 12 from one computer 10 to another computer 18 (e.g., packets are dropped while compute asset 12 is being relocated). When the relocation is completed, the network/network enabled devices 17 match/action mechanisms 20 are updated to process digital information 19 to/from the compute asset 12 in the new computer. Subsequently, digital information 19 is connected again in normal operation to/from the compute asset 12. However, as discussed above, current solutions do not provide the ability to store or otherwise maintain information that is transmitted during the relocation of compute asset 12.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
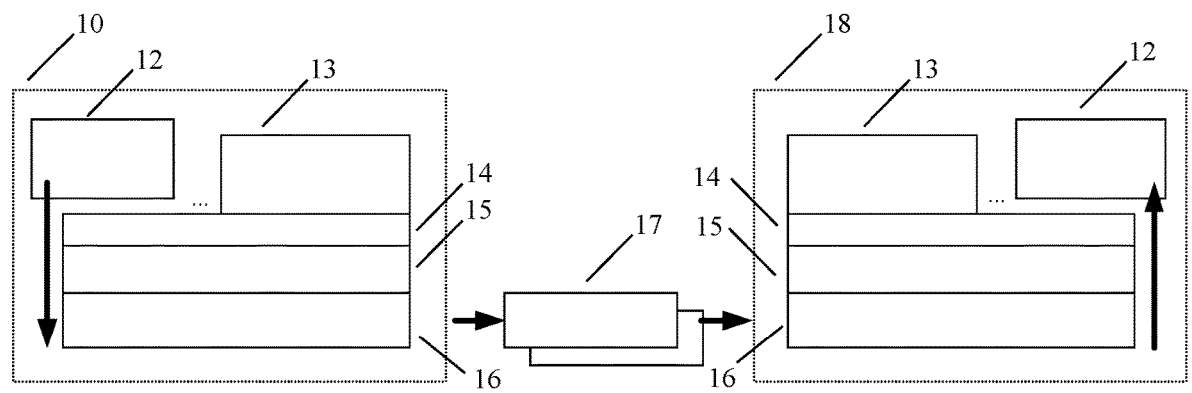
FIG. 1 is a flow-diagram illustrating the movement of compute assets through network/network enabled devices.
Figure 2:
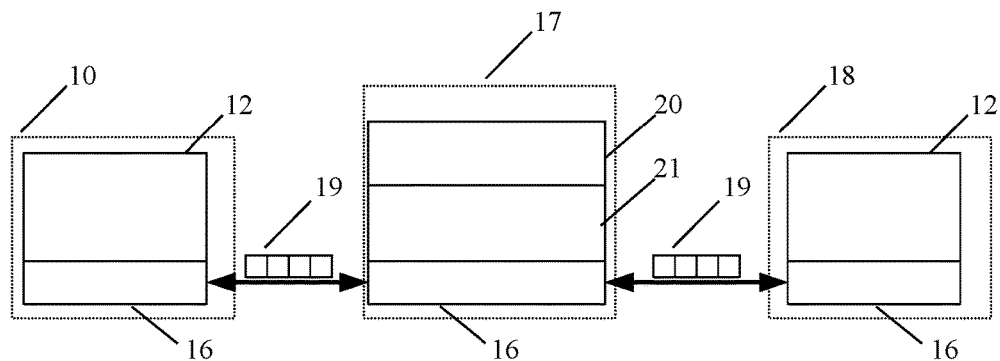
FIG. 2 is a flow-diagram illustrating the digital information of FIG. 1.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include one of software, or firmware, or hardware (such as circuits, microchips, processors, or devices, or any combination thereof), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

1. Overview

Embodiments of the present disclosure provide systems and methods to ensure lossless and ordered delivery of digital information destined for and generated from a plurality of live compute assets following a plurality of compute asset relocations through a plurality of network/network enabled devices (not necessarily in the same facility or physical proximity) in a network. Exemplary methods utilize software to control temporary storage of digital information within physical/virtual network/network enabled devices and within physical/virtual network enabled devices. In an embodiment, the temporary storage of digital information being transmitted to/from the compute asset to be relocated is initiated by software control of one or more controlled devices before the compute asset is signaled to begin relocation. In an embodiment, after the storage of digital information is initiated through the controlled devices, a plurality of live compute assets are relocated to a plurality of computers.

In an embodiment, substantially simultaneously to the relocation of the compute assets, the digital information temporarily stored within the network may be moved and subsequently stored elsewhere within the network to optimize the reliable delivery through software control of the network/network enabled devices. Upon completion of the relocation of the live compute assets, embodiments of the present disclosure complete the traversal of new and stored digital information through the network to/from the relocated compute assets in an ordered, lossless, and reliable manner. In an embodiment, the number of compute assets that can be relocated simultaneously is mainly limited by, but not limited to, network link capacity, latency of the network connectivity between compute locations, time required to prepare compute for movement, time required to restore compute after movement, and network/network enabled device memory available to temporarily store digital information.

In an embodiment, a network controller is notified (or otherwise becomes aware) of when (and, in an embodiment, to where) a compute asset is sought to be relocated. The network controller can either initiate the relocation of the compute asset or otherwise become aware that the relocation is going to be initiated. In an embodiment, the network controller can notify one or more other network components that the relocation of the compute asset is going to take place.

In an embodiment, the network controller can insert rules or mechanisms in a network device (e.g., a switch) to start storing data that was scheduled to be sent to the compute asset. In an embodiment, this temporary storage of data scheduled to be sent to the compute asset preserves information that would otherwise be lost while the compute asset is being relocated. For example, in an embodiment, the network controller could analyze header information in data to make this determination.

In an embodiment, the network controller can select one or more network/network enabled devices ("network devices") to temporarily store the data during the relocation based on a network optimization determination. For example, in an embodiment, the network controller can determine (or otherwise become aware of) how long it will take to start the relocation of the compute asset and can optimize network traffic based on this time determination. In an embodiment, the network controller can select one or more network devices to insert rules for temporary data storage based on determining a path that data would travel through the network and determining which network device would result in the fastest data transmission time (e.g., data transmission time from the old compute asset location, to the temporary storage location, and then to the new compute asset location). In an embodiment, the network controller can also select one or more network devices for temporary storage based on other considerations, such as the volume of the data, how many network elements are in the network, how many network pathways exist, etc.

After the compute asset relocation has been completed, the network controller can determine (or otherwise become aware, e.g., via a system notification) that the compute asset relocation has been completed and can determine (or otherwise become aware, e.g., via a system notification) of a new forwarding location for the compute asset. Subsequently, in an embodiment, the network controller can send an instruction (or other notification) to the one or more network devices used to temporarily store the data during the relocation that instruct the one or more network devices to add forwarding entries to push data to the new location of the relocated compute asset. The network controller can also instruct the one or more network devices to begin transmitting the stored data to the new location of the compute asset. Once the stored data has been transmitted, the one or more network devices used to temporarily store the data during the relocation can remove the inserted rules or mechanisms for temporarily storing the data (e.g., in response to an instruction by the network controller or a determination by the one or more network devices that all stored data has been transmitted). In an embodiment, once the stored data has been transmitted, the one or more network devices used to temporarily store the data during the relocation can also remove the inserted forwarding entries.

In an embodiment, the one or more network devices can also temporarily store any data that was scheduled to be sent to the relocated compute asset that arrives between the time the one or more network devices are notified to begin forwarding the stored data and the time that the one or more network devices have finished transmitting this stored data. In an embodiment, the one or more network devices can remove the rules for temporarily storing data after this data has also been forwarded to the new location of the compute asset. In another embodiment, the one or more network devices can immediately begin forwarding all data scheduled to be sent to the new location of the compute asset once the one or more network devices have received a notification that the relocation has finished. In an embodiment, the one or more network devices can keep track of the time of arrival of data scheduled to be sent to the new location of the compute asset by using timestamps on the stored data and any other data scheduled to be sent to the new location of the compute asset.

Figure 3:
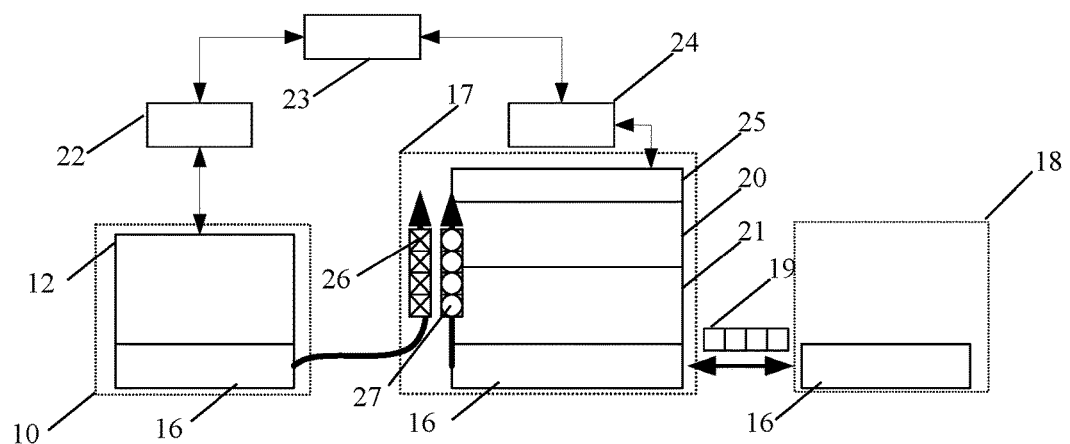
FIG. 3 is a flow-diagram illustrating the network/network enabled device storage action of digital information of FIG. 1 at each network/network enabled device during a compute asset relocation in accordance with an embodiment of the present disclosure.

2. Exemplary Systems for Storing Information During Relocation of a Compute Asset Exemplary embodiments of the present disclosure will now be discussed in more detail with reference to FIGS. 3-7. FIG. 3 is a flow-diagram illustrating the network/network enabled device storage action of digital information of FIG. 1 at each network/network enabled device during a compute asset relocation in accordance with an embodiment of the present disclosure. During a relocation operation, embodiments of the present disclosure prevent the loss of information as a result of the relocation process by storing the digital information 19 that is traversing the network during the relocation within a plurality of network/network enabled devices 17 within memory 25 as shown in FIG. 3.

Referring to FIG. 3, in an embodiment, the capabilities of a plurality of network/network enabled devices 17 can be controlled by a network controller 24 (e.g., using a centralized software program) which can direct the match/action mechanisms 20 on a plurality of network/network enabled devices 17. Network controller 24 can be implemented using hardware, software, and/or a combination of hardware and software. In an embodiment, network controller 24 includes one or more memories and one or more processors (e.g., coupled to or in communication with the one or more memories) configured to perform operations. In an embodiment, network controller 24 can be implemented using computer software, digital logic, circuitry, and/or any other combination of hardware and/or software in accordance with embodiments of the present disclosure. In an embodiment, network controller 24 is implemented using software running on a network device (e.g., a computer) coupled to the computer network illustrated in FIGS. 1-7. In an embodiment, network controller is implemented using a special purpose hardware device coupled to the computer network illustrated in FIGS. 1-7 that is configured to assist in operations for relocation of a compute asset described herein in this disclosure. Network controller 24 can be implemented as a standalone device or as a device that is integrated into another host device in accordance with embodiments of the present disclosure.

In accordance with embodiments of the present disclosure, the network controller 24 can effectively program one or more of network/network enabled devices 17 to implement a store action for the digital information 19 traversing the network to/from the relocating compute asset 12. In an embodiment, the selected network/network enabled device(s) 17 implement the store action 26 for digital information 19 arriving from the existing compute asset 12 in computer 10, as well as a store action 27 for digital information 19 traversing a plurality of network/network enabled devices 17 destined for the compute asset 12 in the existing computer 10. The storage of the digital information 19 occurs inside the network/network enabled devices 17 in memory 25.

In FIG. 3, an orchestrator 23 (e.g., in an embodiment, a software orchestrator) communicates to a plurality of network controllers 24 and to a plurality of software/virtualization controllers 22. The software/virtualization controllers 22 instruct the computer software, such as, but not limited to, a hypervisor or host operating system/container engine, to relocate a compute asset 12 from computer 10 to computer 18. Additionally, the orchestrator 23 instructs the network controller 24 to store the digital information 19 to/from the compute asset 12. The network controller 24 communicates to a plurality of network/network enabled devices 17 to instruct the devices to implement a store action in their match/action mechanisms 20. Digital information 19 is stored in network/network enabled device 17 memory 25 and the network controller 24 is notified of digital information that has been stored in memory 25.

Orchestrator 23 can be implemented using hardware, software, and/or a combination of hardware and software. In an embodiment, orchestrator includes one or more memories and one or more processors (e.g., coupled to or in communication with the one or more memories) configured to perform operations. In an embodiment, orchestrator 23 can be implemented using computer software, digital logic, circuitry, and/or any other combination of hardware and/or software in accordance with embodiments of the present disclosure. In an embodiment, orchestrator 23 is implemented using software running on a network device (e.g., a computer) coupled to the computer network illustrated in FIGS. 1-7. In an embodiment, orchestrator 23 is implemented using a special purpose hardware device coupled to the computer network illustrated in FIGS. 1-7 that is configured to assist in operations for relocation of a compute asset described herein in this disclosure. Orchestrator 23 can be implemented as a standalone device or as a device that is integrated into another host device in accordance with embodiments of the present disclosure.

Figure 4:
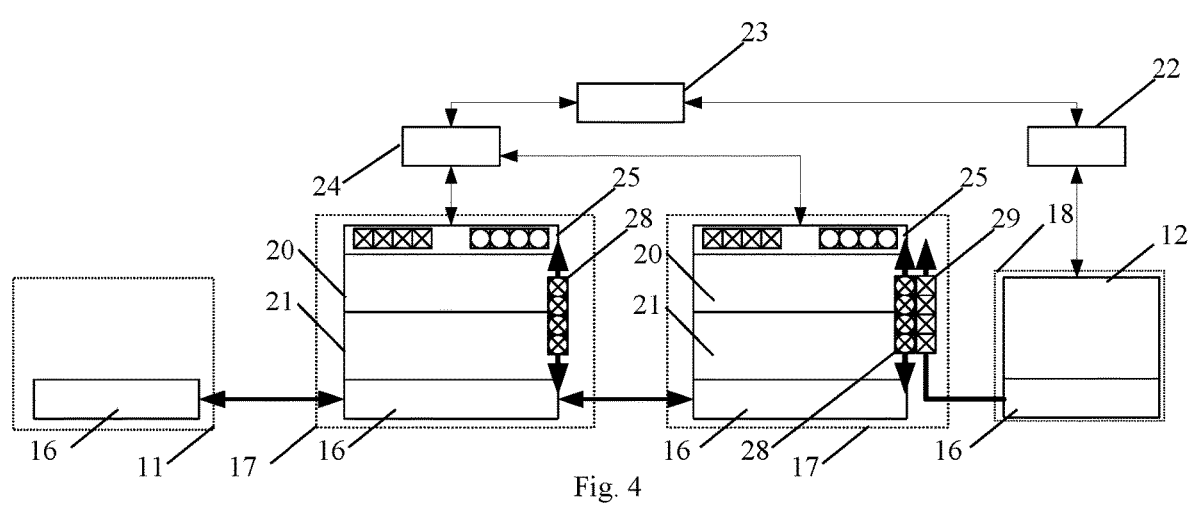
FIG. 4 is a flow-diagram illustrating the movement of temporarily stored digital information of FIG. 1 while the compute asset is relocating/entering an operational state on the new computer in accordance with an embodiment of the present disclosure.

In FIG. 4, a plurality of network/network enabled devices 17 memory 25 holds the digital information 19 traversing the network to/from the compute asset 12 that is being relocated to another computer 18. Concurrently, the orchestrator 23, the software/virtualization controllers 22, and the network controllers 24 are utilized to optimize the storage of digital information in the memory of a plurality of network/network enabled devices 17 by moving 28 previously stored digital information 17 between network/network enabled devices for optimized delivery as determined by software algorithms within the orchestrator 23 and network controllers 24. Optimization continues until the compute asset 12 becomes operational in the new computer 18 and the compute asset 12 begins to send 29 digital information to the network through the virtual or physical connection (PHY)/network interface 16.

Figure 5:
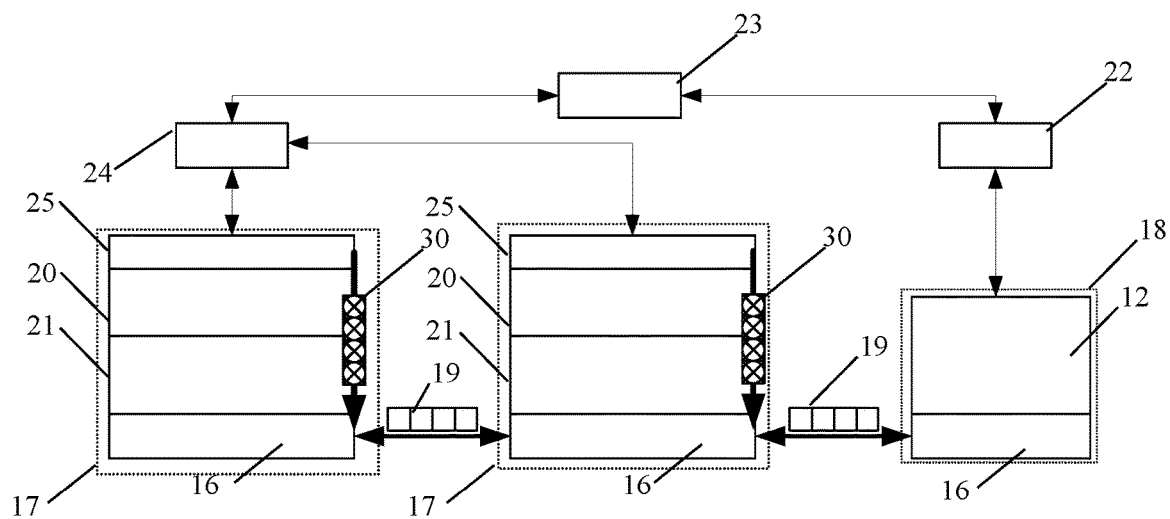
FIG. 5 is a flow-diagram illustrating the release of all temporary network storage of digital information of FIG. 1 and return to normal operation for the compute asset after relocation in accordance with an embodiment of the present disclosure.

In FIG. 5, the relocation of the compute asset 12 has been completed, the software/virtualization controller 22 notifies the orchestrator 23 which will inform the network controller 24. The network controller 24 will begin to release 30 digital information from the memory 25 of a plurality of network/network enabled devices 17 from/to the compute asset 12 as determined by software algorithms within the orchestrator 23 and network controllers 24. Concurrently or subsequently, the network controller 24 will program a plurality of network/network enabled device 17 match/action mechanisms 20 to send digital information 19 destined to/from the compute asset 12 in the new computer 18 through the network.

Figure 6:
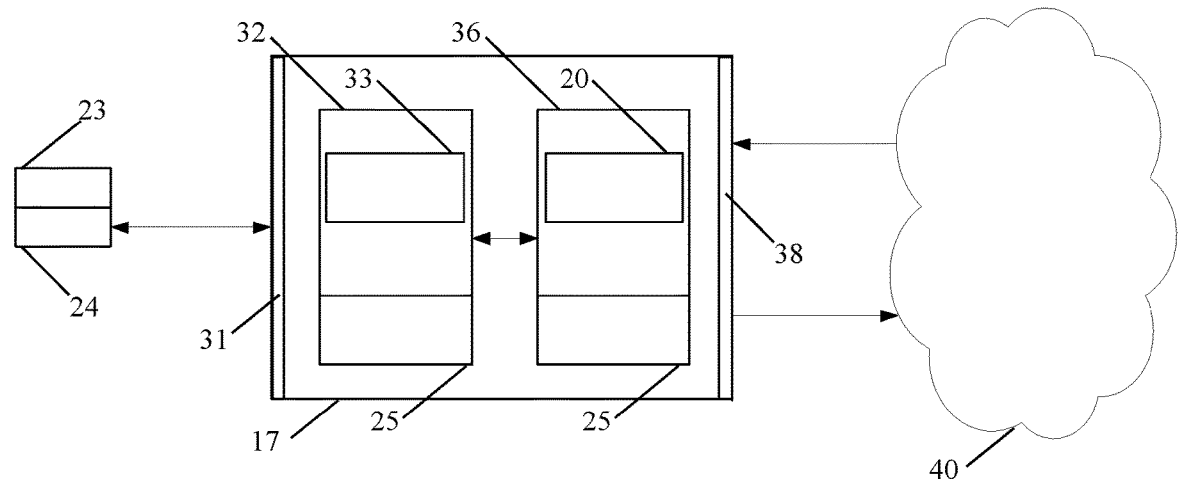
FIG. 6 is a diagram illustrating the software control of a physical network/network enabled device and the major device components involved with the temporary storage of digital information in accordance with an embodiment of the present disclosure.

In FIG. 6, the significant components of physical network/network enabled devices 17 are shown. A plurality of network/network enabled devices 17 and devices connected via physical connection (PHY)/network interfaces are represented by the cloud 40. The cloud 40 is connected to the network/network enabled device 17 through data plane 38 physical connection (PHY)/network interfaces which directly interface with the Application Specific Integrated Circuit/Field Programmable Gate Array/Network Processing Unit/Central Processing Unit 36 which executes the match/action mechanism 20 to process digital information received through the data plane 38. Storage of digital information in the Application Specific Integrated Circuit/Field Programmable Gate Array/Network Processing Unit/Central Processing Unit 36 is performed in both internal and/or external memory 25. The Application Specific Integrated Circuit/Field Programmable Gate Array/Network Processing Unit/Central Processing Unit 36 is programmatically controlled via the network operating system/software agent 33 which controls the Central Processing Unit (CPU) 32. The network operating system/software agent 33 processes the exchange of digital information to/from the Application Specific Integrated Circuit/Field Programmable Gate Array/Network Processing Unit/Central Processing Unit 36 and to/from the network controller 24. The digital information exchange between the network controller 24 and Central Processing Unit (CPU) 32 occurs through the network/network enabled device control plane 31 physical connection (PHY)/network interfaces. Certain match/actions in the match/action mechanism 20 will provide data plane 38 digital information to the Central Processing Unit (CPU) 32 for additional processing, storage and/or transfer to the network controller 24. The Central Processing Unit (CPU) 32 stores digital information in internal and/or external memory 25.

Figure 7:
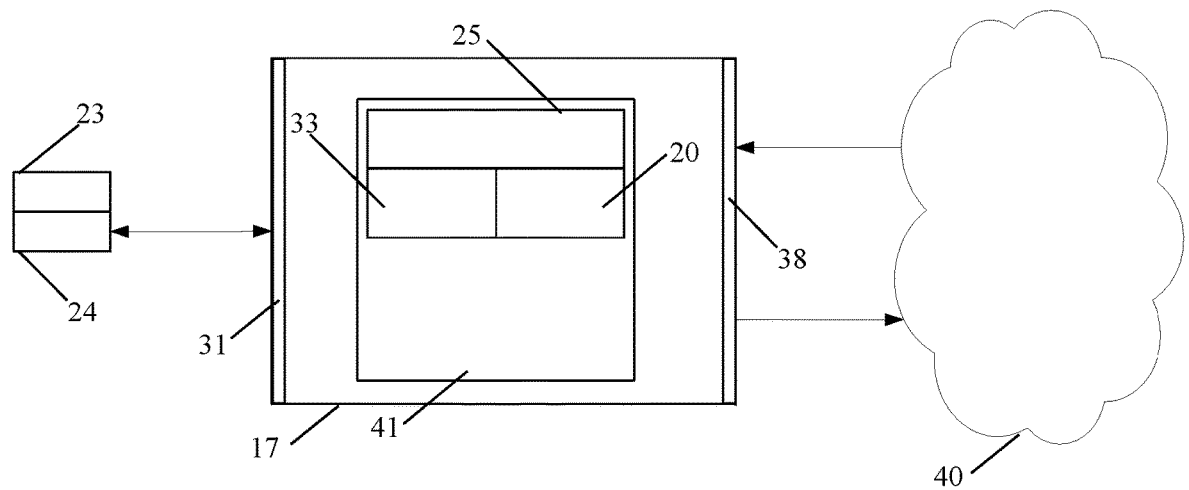
FIG. 7 is a diagram illustrating the software control of a virtual network/network enabled device and the components involved with the temporary storage of digital information in accordance with an embodiment of the present disclosure.

In FIG. 7, the significant components of a virtual instantiation of a network/network enabled device 17 are shown. A plurality of network/network enabled devices 17 and devices connected via virtual and/or physical connection (PHY)/network interfaces are represented by the cloud 40. The cloud 40 is connected to the network/network enabled device 17 through data plane 38 virtual and/or physical connection (PHY)/network interfaces which directly interface with the Network Device Algorithm 41 which includes, but is not limited to, a network operating system/software agent 33 and a match/action mechanism 20 to process digital information received through the data plane 38. Storage of digital information in the Network Device Algorithm 41 is performed in the memory 25 allocated to the Network Device Algorithm 41. The Network Device Algorithm 41 is programmatically controlled via the network operating system/software agent 33 which processes the exchange of digital information to the network controller 24. The digital information exchange between the network controller 24 and the Network Device Algorithm 41 occurs through the network/network enabled device control plane 31 virtual and/or physical connection (PHY)/network interfaces.

The advantages of embodiments of the present disclosure include, without limitation, 1) the ability to ensure 99.999% reliable delivery of digital information to compute assets that are being relocated on the same or different computer platforms; 2) the ability to utilize a plurality of network/network enabled devices as a storage medium for digital information that would otherwise not be delivered during a compute asset relocation 3) the ability to optimize the temporary storage location of digital information being temporarily stored in relation to the final compute asset destination computer; 4) the ability to use all controlled network/network enabled devices as temporary storage medium; 5) the ability to change the network/network enabled device match/actions in conjunction with the relocation of a compute asset to ensure traffic is delivered to the final compute asset destination computer 6) the ability to ensure that delivery of digital information stored and in transit through the network arrives to/from the compute asset in an ordered, lossless, and reliable manner per algorithms designed for different compute asset applications and requirements; and 7) the ability to relocate compute assets through a network without any loss of digital information will significantly increase agility and decrease cost of high reliability computer and network based applications.

Embodiments of the present disclosure provide the ability to selectively and temporarily store digital information within a plurality of virtual and physical network/network enabled devices using hardware, software, and/or a combination of hardware or software. For example, in an embodiment, a centralized software algorithm (e.g., implemented using network controller 24) can be used to selectively and temporarily store the digital information within the plurality of virtual and physical network/network enabled devices. In an embodiment, digital logic or other circuitry (e.g., implemented using network controller 24) can be used to selectively and temporarily store the digital information within the plurality of virtual and physical network/network enabled devices.

Figure 8:
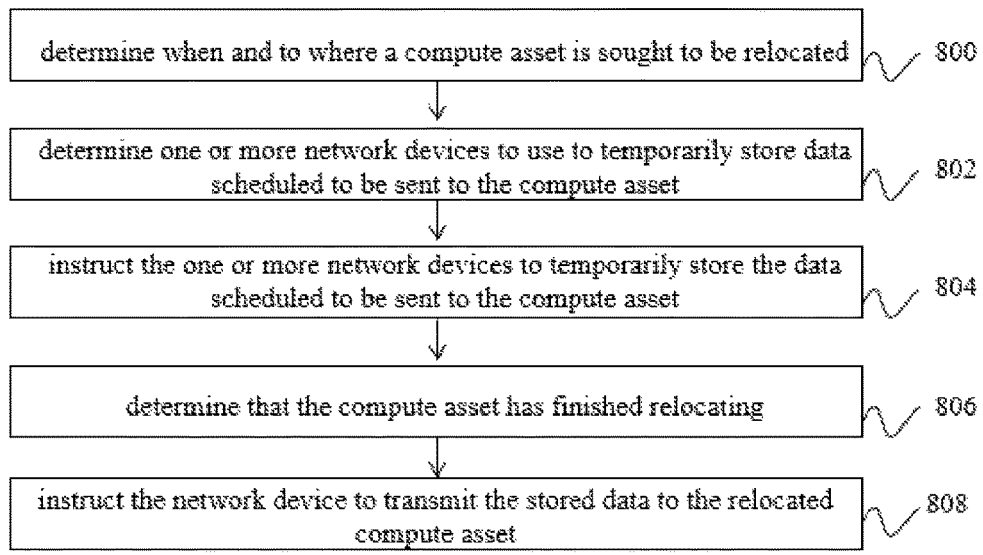
FIG. 8 is a flowchart of an exemplary method for relocating a live compute asset in accordance with an embodiment of the present disclosure.

3. Exemplary Methods for storing information during relocation of a Compute Asset FIG. 8 is a flowchart of an exemplary method for relocating a live compute asset in accordance with an embodiment of the present disclosure. In step 800, a network controller determines when and to where a compute asset is sought to be relocated. For example, network controller 24 can be notified (or otherwise become aware) of when a compute asset is sought to be relocated and a destination location of a device for the compute asset.

In step 802, the network controller (e.g., network controller 24) can determine one or more network devices (e.g., one or more of network/network enabled devices 17) to use to temporarily store data scheduled to be sent to the compute asset (e.g., compute asset 12). In step 804, the network controller (e.g., network controller 24) can instruct the one or more network devices to temporarily store the data scheduled to be sent to the compute asset. For example, in an embodiment, network controller 24 can insert rules or mechanisms in one or more of network/network enabled devices 17 to start storing data that was scheduled to be sent to compute asset 12.

In step 806, the network controller (e.g., network controller 24) can determine that the compute asset (e.g., compute asset 12) has finished relocating. In step 808, the network controller (e.g., network controller 24) can instruct the network device (e.g., one or more of network/network enabled devices 17) to transmit the stored data to the relocated compute asset.

4. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A method, comprising:
receiving, using a network controller device, a notification from an orchestrator device indicating that a compute asset is sought to be relocated within a computer network, wherein the network controller device does not include the orchestrator device;
determining, using the network controller device, a destination location of a device for the compute asset;
determining, using the network controller device, a network device to use to temporarily store data scheduled to be sent to the compute asset;
instructing, using the network controller device, the network device to temporarily store the data scheduled to be sent to the compute asset;
instructing, using a software/virtualization controller, computer software to relocate the compute asset, wherein the network controller device does not include the software/virtualization controller;
determining, using the network controller device, that the compute asset has finished relocating; and
instructing, using the network controller device, the network device to transmit the stored data to the relocated compute asset at the destination location.

2. The method of claim 1, wherein instructing the network device to temporarily store the data scheduled to be sent to the compute asset further comprises:
instructing the network device to insert rules to store the data scheduled to be sent to the compute asset.

3. The method of claim 2, further comprising:
instructing the network device to remove the rules to store the data scheduled to be sent to the compute asset after determining that the compute asset has finished relocating.

4. The method of claim 1, wherein instructing the network device to transmit the data to the relocated compute asset further comprises:
instructing the network device to add forwarding entries to push the stored data to the relocated compute asset at the destination location.

5. The method of claim 4, further comprising:
instructing the network device to remove the forwarding entries after determining that the compute asset has finished relocating.

6. The method of claim 1, wherein determining that the compute asset has finished relocating further comprises:
determining that the compute asset has finished relocating in response to receiving a second notification from the orchestrator device.

7. The method of claim 1, wherein determining the network device to use to temporarily store the data scheduled to be sent to the compute asset further comprises:
selecting the network device from a plurality of network devices based on determining that the network device would transmit the stored data to the relocated compute asset faster than another network device in the plurality of network devices.

8. The method of claim 1, wherein determining the network device to use to temporarily store the data scheduled to be sent to the compute asset further comprises:
selecting the network device from a plurality of network devices based on determining that the network device has available memory to temporarily store the data scheduled to be sent to the compute asset.

9. The method of claim 1, further comprising:
moving the data from the network device to a second network device before transmitting the stored data to the relocated compute asset at the destination location.

10. The method of claim 9, further comprising
selecting the second network device based on a determination that selecting the second network device would optimize speed of delivery of the stored data to the relocated compute asset at the destination location.

11. A network controller device, comprising:
a memory; and
a processor, coupled to the memory, configured to:
receive a first notification from an orchestrator device indicating that a compute asset is sought to be relocated within a computer network and a destination location of a device for the compute asset, wherein the network controller device does not include the orchestrator device,
determine a network device to use to temporarily store data scheduled to be sent to the compute asset,
instruct the network device to temporarily store the data scheduled to be sent to the compute asset,
receive a second notification from a software/virtualization controller indicating that the compute asset has been relocated,
determine that the compute asset has finished relocating in response to receiving the second notification, and
instruct the network device to transmit the stored data to the relocated compute asset at the destination location.

12. The network controller device of claim 11, wherein the processor is further configured to:
instruct the network device to add forwarding entries to transmit the stored data to the relocated compute asset at the destination location.

13. A system, comprising:
a processor device;
an orchestrator device, configured to:
send, using the processor device, a first notification indicating that a compute asset is sought to be relocated within a computer network and a destination location of a device for the compute asset, and
send, using the processor device, a second notification indicating that the compute asset has finished relocating;
a network controller device, wherein the network controller device does not include the orchestrator device, and wherein the network controller device is configured to:
receive, using the processor device, the first notification,
in response to receiving the first notification:
determine, using the processor device, a network device to use to temporarily store data scheduled to be sent to the compute asset, and
instruct, using the processor device, the network device to temporarily store the data scheduled to be sent to the compute asset,
receive, using the processor device, the second notification, and
instruct, using the processor device, the network device to transmit the stored data to the relocated compute asset at the destination location in response to receiving the second notification; and
a software/virtualization controller configured to instruct, using the processor device, computer software to relocate the compute asset.

14. The system of claim 13, wherein the network controller device is further configured to:
instruct, using the processor device, the network device to insert rules to store the data scheduled to be sent to the compute asset in response to receiving the first notification.

15. The system of claim 13, wherein the network controller device is further configured to:
instruct, using the processor device, the network device to add forwarding entries to push the stored data to the relocated compute asset at the destination location in response to receiving the second notification.

16. The system of claim 13, wherein the orchestrator device is configured to send, using the processor device, a plurality of notifications, indicating that a respective plurality of compute assets are sought to be relocated within the computer network, to a plurality of network controller devices within the computer network.

17. The system of claim 16, wherein the orchestrator device is configured to communicate, using the processor device, with a plurality of software/virtualization controllers within the computer network, wherein respective network controller devices in the plurality of network controller devices do not include respective software/virtualization controllers in the plurality of software/virtualization controllers.

18. The system of claim 13, wherein the network controller device is configured to instruct, using the processor device, the network device to transmit the stored data to the relocated compute asset, based on a compute asset application, such that the stored data is transmitted in an ordered and lossless manner.

19. The system of claim 13, wherein the software/virtualization controller is further configured to:
send, using the processor device, a third notification to the orchestrator device, wherein the third notification indicates that the compute asset has been relocated, and wherein the orchestrator device is further configured to send, using the processor device, the second notification in response to receiving the third notification.

20. The system of claim 19, wherein the orchestrator device is further configured to:
in response to receiving the third notification, program, using the processor device, a plurality of match/action mechanisms in a plurality of network devices for sending information to and from the relocated compute asset.

* * * * *